US008199337B2

(12) United States Patent
Narukawa

(10) Patent No.: US 8,199,337 B2
(45) Date of Patent: Jun. 12, 2012

(54) IMAGE READING DEVICE

(75) Inventor: Toshiki Narukawa, Kasugai (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 902 days.

(21) Appl. No.: 12/046,849

(22) Filed: Mar. 12, 2008

(65) Prior Publication Data
US 2008/0225352 A1 Sep. 18, 2008

(30) Foreign Application Priority Data

Mar. 12, 2007 (JP) ................. 2007-062158

(51) Int. Cl.
H04N 1/40 (2006.01)

(52) U.S. Cl. ...................... 358/1.12; 358/468

(58) Field of Classification Search .................. 358/2.1, 358/1.5, 1.12, 468, 488, 461, 499; 399/189–190, 399/370–371, 394–395
See application file for complete search history.

(56) References Cited

U.S. PATENT DOCUMENTS

| 4,511,242 | A | * | 4/1985 | Ashbee et al. | 399/395 |
| 5,255,987 | A | * | 10/1993 | Mizuno et al. | 400/61 |
| 5,748,344 | A | * | 5/1998 | Rees | 358/505 |
| 6,697,600 | B2 | | 2/2004 | Nishikino et al. | |

FOREIGN PATENT DOCUMENTS

| JP | 60-026049 | | 2/1985 |
| JP | 60-166943 | | 8/1985 |
| JP | 60-169843 | | 9/1985 |
| JP | 03-110434 | | 11/1991 |
| JP | 06-217090 | | 8/1994 |
| JP | 07-270937 | | 10/1995 |
| JP | 2000-209405 | | 7/2000 |
| JP | 2001-066712 | | 3/2001 |
| JP | 2002-350997 | | 12/2002 |
| JP | 2003-234890 | | 8/2003 |
| JP | 2004336393 | A * | 11/2004 |
| JP | 2005217914 | A * | 8/2005 |

OTHER PUBLICATIONS

Notification of Reason for Refusal: Japanese Application No. 2007-062158, Reference No. PBR03158, Dispatch No. 068927, Dispatch Date: Feb. 3, 2009.

* cited by examiner

Primary Examiner — Thomas D Lee
Assistant Examiner — Stephen M Brinich
(74) Attorney, Agent, or Firm — Banner & Witcoff, Ltd.

(57) ABSTRACT

An image reading device includes: a document placing table including a first area and a second area; an image reading unit which reads an image on a document placed on the document placing table to obtain image data; a first detector configured to detect the document on the first area; and a controller including: a determining unit which determines that the document is placed on the first area if the first detector detects the document and determines that the document is placed on the second area if the first detector does not detect the document; and a first correction unit which corrects the image data obtained by the image reading unit based on a result of the determination by the determining unit.

10 Claims, 6 Drawing Sheets

IMAGE READING DEVICE

CROSS-REFERENCE TO RELATED APPLICATION

This application claims priority from Japanese Patent Application No. 2007-062158, filed on Mar. 12, 2007, the entire subject matter of which is incorporated herein by reference.

TECHNICAL FIELD

Aspects of the present invention relate to a flatbed image reading device.

BACKGROUND

A flatbed image reading device reads an image formed (printed) on a document by means of an image pickup device in a state that the document is placed on a document placing table. In this flatbed image reading device, if a document placed on the document placing table is curved, the quality of read image data deteriorates.

In response to this disadvantage, JP-A-60-166943 describes a technique to correct the curvature of the document by pressing the document to the document placing table by a document pressing member attached on a cover which covers the document placing table.

However, in the case where one end of the document is bound (assembled) like a book or the document has high rigidity (firm), even if the document is pressed by the document pressing member, the curvature of the document could not be reliably corrected, and the quality of read image data could not be sufficiently improved.

For such a case, for example, JP-A-2003-234890 describes a technique to prevent the quality of image data from being deteriorated by correcting image data read by an image pickup device through an image data correction processing.

However, the image data correction processing is a great load processing. Therefore, the document reading speed would become lower by the correction processing and the efficiency of a document reading operation would deteriorate.

SUMMARY

Exemplary embodiments of the present invention address the above disadvantages and other disadvantages not described above. However, the present invention is not required to overcome the disadvantages described above, and thus, an exemplary embodiment of the present invention may not overcome any of the problems described above.

Accordingly, it is an aspect of the present invention to provide an image reading device which can improve efficiency of a reading operation while preventing quality deterioration of read image data.

According to an exemplary embodiment of the present invention, there is provided an image reading device including: a document placing table including a first area and a second area; an image reading unit which reads an image on a document placed on the document placing table to obtain image data; a first detector configured to detect the document on the first area; and a controller including: a determining unit which determines that the document is placed on the first area if the first detector detects the document and determines that the document is placed on the second area if the first detector does not detect the document; and a first correction unit which corrects the image data obtained by the image reading unit based on a result of the determination by the determining unit.

BRIEF DESCRIPTION OF THE DRAWINGS

The above and other aspects of the present invention will become more apparent and more readily appreciated from the following description of exemplary embodiments of the present invention taken in conjunction with the attached drawings, in which.

DETAILED DESCRIPTION (First Exemplary Embodiment)

Exemplary embodiments of the present invention will now be discussed with reference to the accompanying drawings.

Referring to drawings, an image reading device according to an exemplary embodiment of the present invention is implemented as an image reading device (scanner) having an automatic document feeding and reading function for reading an image on a document while automatically feeding the document and a stationary document reading function for reading an image on a document placed stationary.

1. Schematic Configuration of Image Reading Device

Figure 1:
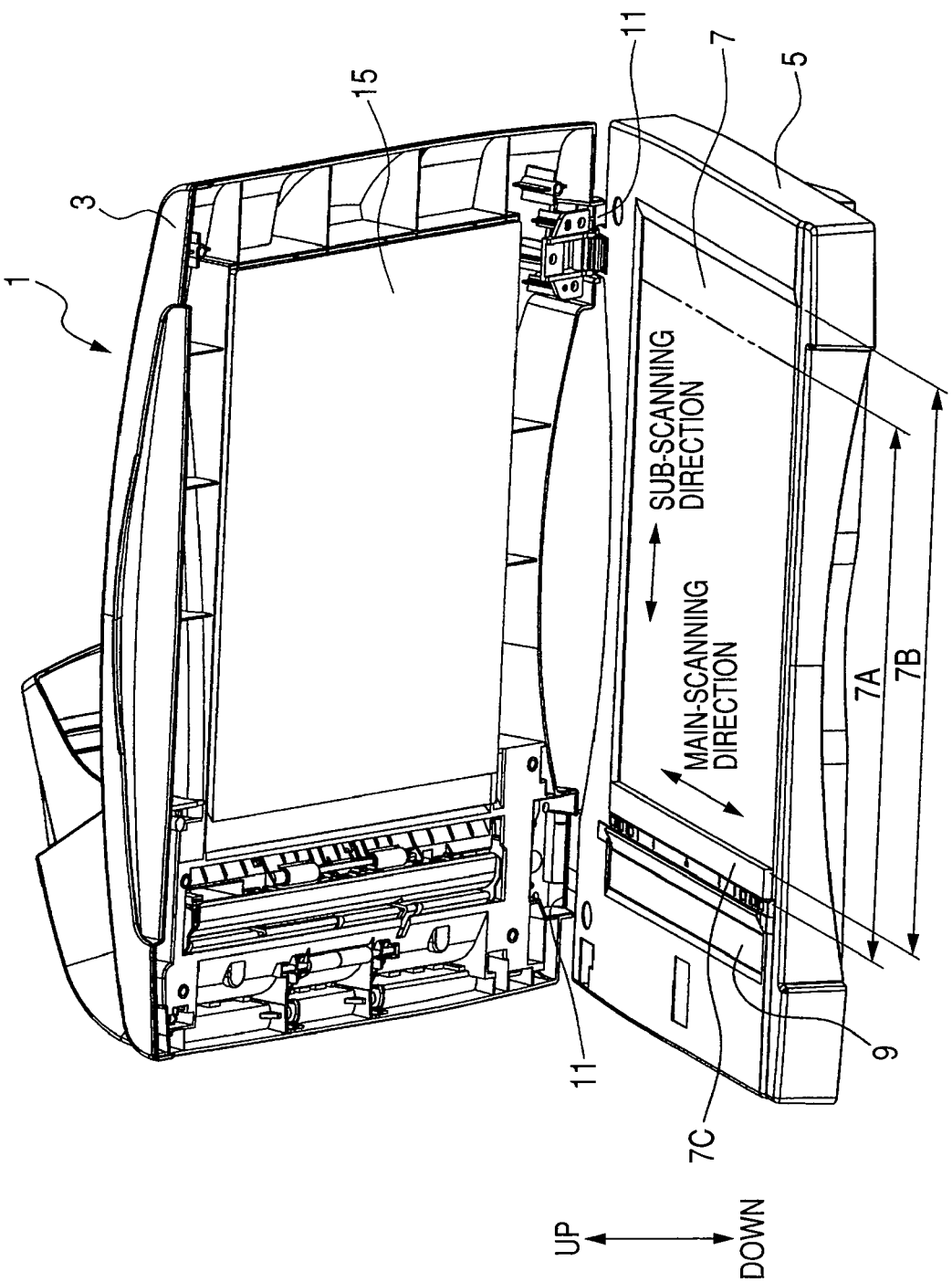
FIG. 1 is a perspective view showing a state that a document cover of an image reading device according to a first exemplary embodiment is opened.
Figure 2:
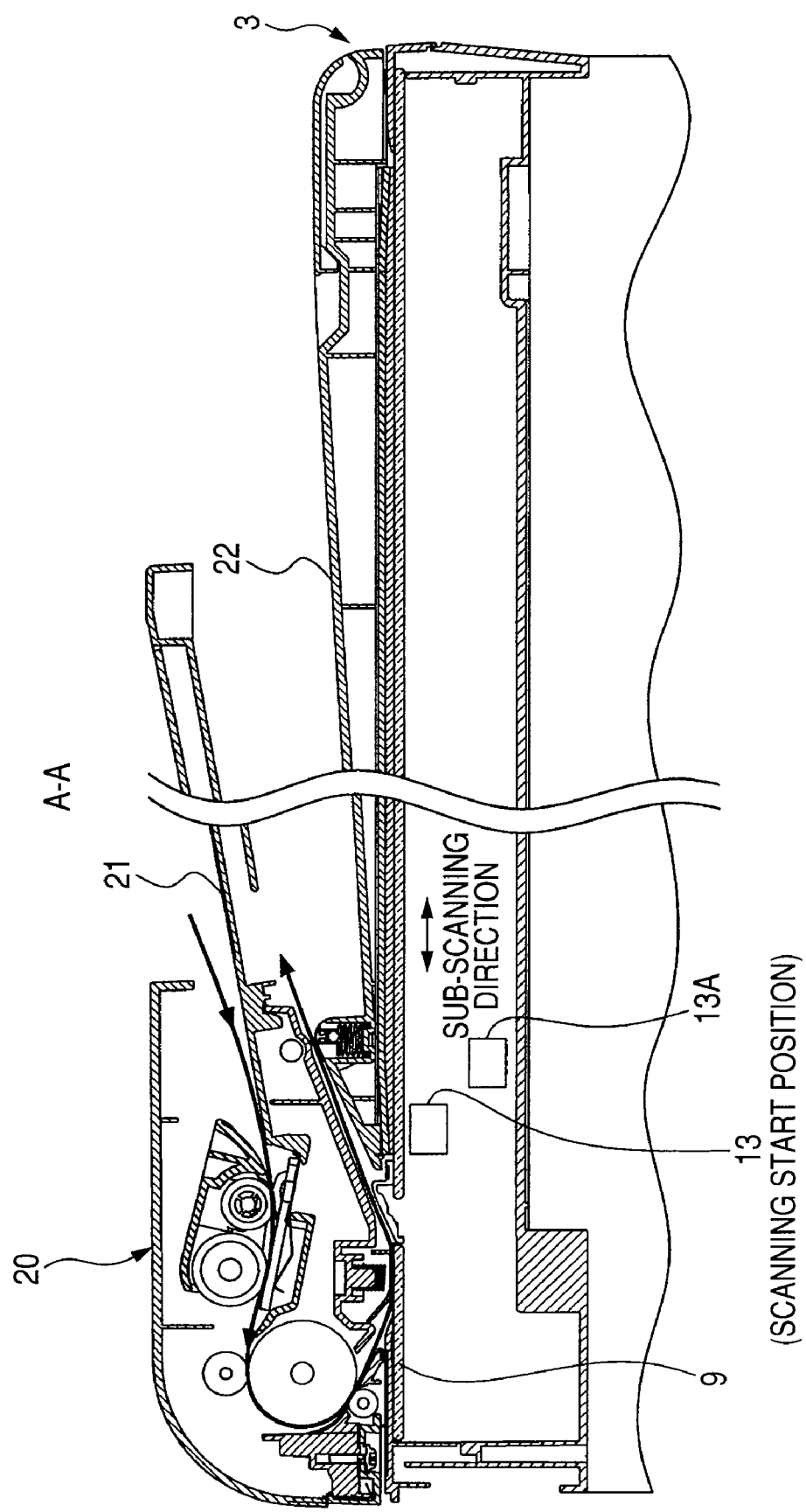
FIG. 2 is a central sectional view of the image reading device according to the first exemplary embodiment of the present invention.
Figure 3A:
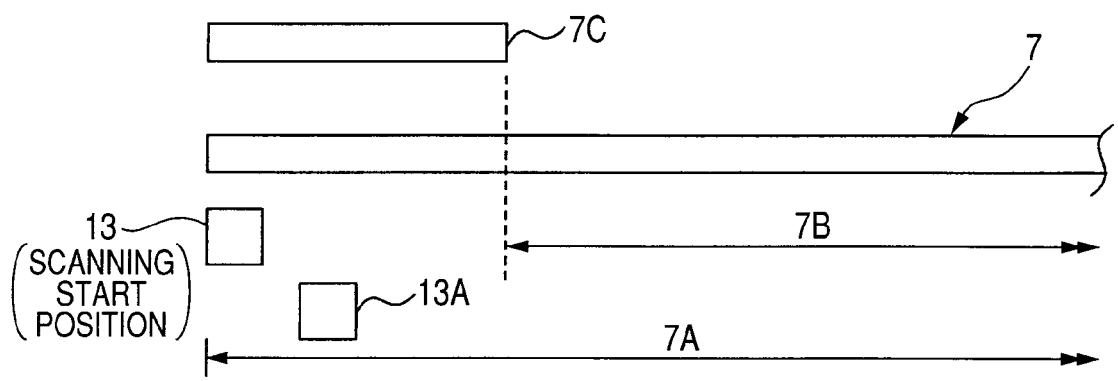
FIGS. 3A and 3B are conceptual views of a first document placing table according to the first exemplary embodiment of the present invention.
Figure 3B:
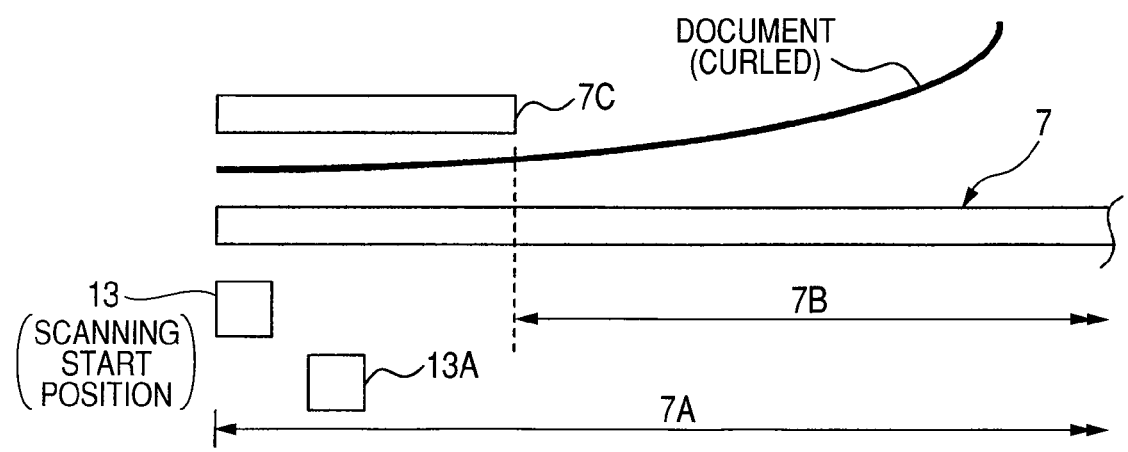

FIG. 1 is a perspective view showing a state that a document cover of an image reading device according to a first exemplary embodiment is opened, FIG. 2 is a central sectional view of the image reading device, and FIGS. 3A and 3B are conceptual views of a document placing table. As shown in FIG. 1, an image reading device 1 includes a document placing table 5 on which a document is placed, and a document cover 3 pivotably attached to the document placing table about a hinge mechanism 11.

The document placing table 5 includes an image reading window (hereinafter, referred to as a stationary reading window) 7 for the stationary document reading function, which lies substantially horizontally, and an image reading window 9 for the automatic document feeding and reading function, as shown in FIG. 1. Both reading windows 7 and 9 are closed by transparent platens made of glass, acryl, or the like.

2. Configuration of Stationary Reading Window

The document cover 3 is for covering the stationary reading window 7 from above. By rotating (opening and closing) the document cover 3 with respect to the document placing table 5, it is switchable between a closed state where the stationary reading window 7 is covered by the document cover 3 from above and an open state where the stationary reading window 7 is opened.

The stationary reading window 7 includes a first placing area 7A and a second placing area 7B as areas for placing a document. A part in the longitudinal direction (a sub-scanning direction of an image pickup device 13 described later) of the first placing area 7A overlaps with the second placing area 7B, and the first placing area 7A is relatively displaced for a scanning start position side from the second placing area 7B in the sub-scanning direction of the image pickup device 13. Hereinafter, the term "stationary reading window 7" will be used as a collective term of the first placing area 7A and the second placing area 7B.

In FIG. 2, the image pickup device 13 receives light irradiated onto and reflected from a document and outputs an electric signal based on this received light. Accordingly, the image reading device 1 reads an image of a letter, etc., on a document by converting the received light into an electric signal via the image pickup device 13.

The image pickup device 13 is provided in the document placing table 5 movably in the longitudinal direction of the document placing table 5 (sub-scanning direction of the image pickup device 13). When the automatic document feeding and reading function is operated, the image pickup device 13 reads an image in a state where the image pickup device 13 stays just below the automatic reading window 9. On the other hand, when the stationary document reading function is operated, the image pickup device 13 reads the image while moving below the stationary reading window 7 from a scanning start position in the sub-scanning direction. The scanning start position is located at a side of the automatic reading window 9 of the stationary reading window 7.

In this exemplary embodiment, the image pickup device 13 employs a contact image sensor (CIS). The longitudinal direction (main-scanning direction) of the CIS (image pickup device 13) extends in a direction orthogonal to a moving direction (sub-scanning direction) thereof below both of the reading windows 7 and 9.

The document cover 3 includes a document pressing member 15 at a position opposing the stationary reading window 7, as shown in FIG. 1. The document pressing member 15 presses a document placed on the stationary reading window 7 to the stationary reading window 7. The document pressing member 15 includes an elastic member which is elastically deformable such as a sponge, and a sheet affixed on the stationary reading window 7 side of this elastic member, etc.

In the stationary reading window 7, at an end on the scanning start position side (automatic reading window 9 side in this exemplary embodiment) in the sub-scanning direction, the first placing area 7A and the second placing area 7B do not overlap with each other, and only the first placing area 7A is provided as an area for placing a document.

In this area including only a part of the first placing area 7A, as shown in FIG. 1, a document end pressing member 7C which presses a document placed on the first placing area 7A to the first placing area 7A is provided.

A document placement sensor 13A is provided at a portion corresponding to the document end pressing member 7C on the side opposite to the document end pressing member 7C with respect to the stationary reading window 7 (first placing area 7A), that is, below the document end pressing member 7C, as shown in FIG. 2. The document placement sensor 13A detects whether a document has been inserted between the document end pressing member 7C and the stationary reading window 7, that is, whether a document is placed on the first placing area 7A.

In this exemplary embodiment, as the document placement sensor 13A, an optical detecting unit which detects the presence of a document by irradiating light onto the document end pressing member 7C and detecting reflected light is used, so that the stationary reading window 7 side of the document end pressing member 7C is colored with black to prevent erroneous detection of the document placement sensor 13A.

However, the image pickup device 13 moves in the sub-scanning direction, so that when scanning the entire range of the document with the image pickup device 13, at a portion corresponding to the document end pressing member 7C, the image pickup device 13 and the document placement sensor 13A may overlap in the direction orthogonal to the stationary reading window 7.

When the image pickup device 13 and the document placement sensor 13A overlap with each other in the direction orthogonal to the stationary reading window 7, the presence of the image pickup device 13 may become an obstacle and may make it impossible for the document placement sensor 13A to detect whether a document has been placed.

Therefore, in this exemplary embodiment, as shown in FIG. 2, in a standby state that document reading is not performed, the image pickup device 13 is made to stand by at a position displaced toward the scanning start position from the document placement sensor 13A. According to this configuration, the document placement sensor 13A is reliably prevented from becoming incapable of detecting whether a document has been placed.

3. Automatic Document Feeder

The document cover 3 includes an automatic document feeder at a portion corresponding to the automatic reading window 9 and near this portion as shown in FIG. 2. The automatic document feeder includes an automatic document feeding mechanism 20 which feeds a document to be read to the automatic reading window 9.

Additionally, the document cover 3 includes a document tray 21 and a discharging tray 22. The document tray 21 is a placing area for placing a document to be read. Documents stacked in this document tray 21 are fed to the automatic reading window 9 by the automatic document feeding mechanism 20 and then discharged and placed in the discharging tray 22.

4. Schematic Electric Configuration of Image Reading Device

Figure 4:
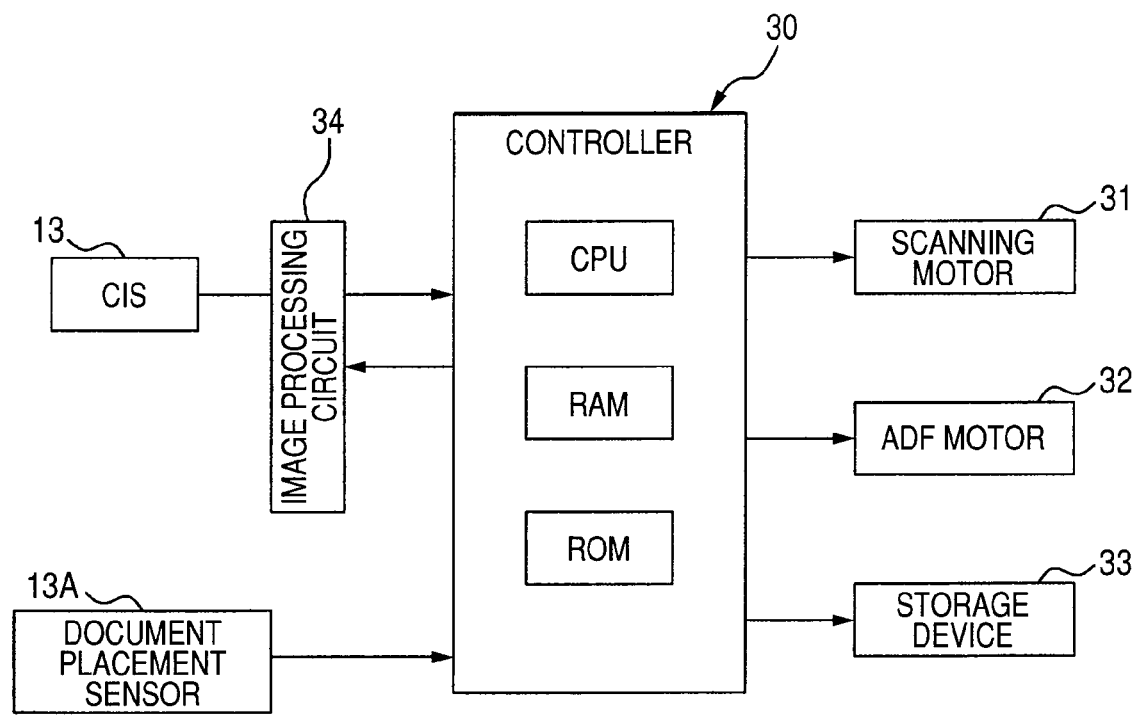
FIG. 4 is a block diagram showing a schematic electrical configuration of the image reading device according to the first exemplary embodiment of the present invention.

FIG. 4 is a block diagram showing a schematic electrical configuration of the image reading device 1. A controller 30 is a control unit constituted by a microcomputer including a CPU, a RAM, and a ROM, etc.

To the controller 30, the image pickup device 13, the document placement sensor 13A, a motor 31 for moving the image pickup device 13, a motor 32 for operating the automatic document feeding mechanism 20, a storage device 33 for storing electronic data of a read image (hereinafter, referred to image data), and so on are coupled, and the controller 30 controls these units 31 through 33.

An image processing circuit 34 corrects image data read by the image pickup device 13 by electric processing, and operations of this image processing circuit 34 are controlled by the controller 30.

5. Operation of Image Reading Device

Figure 5:
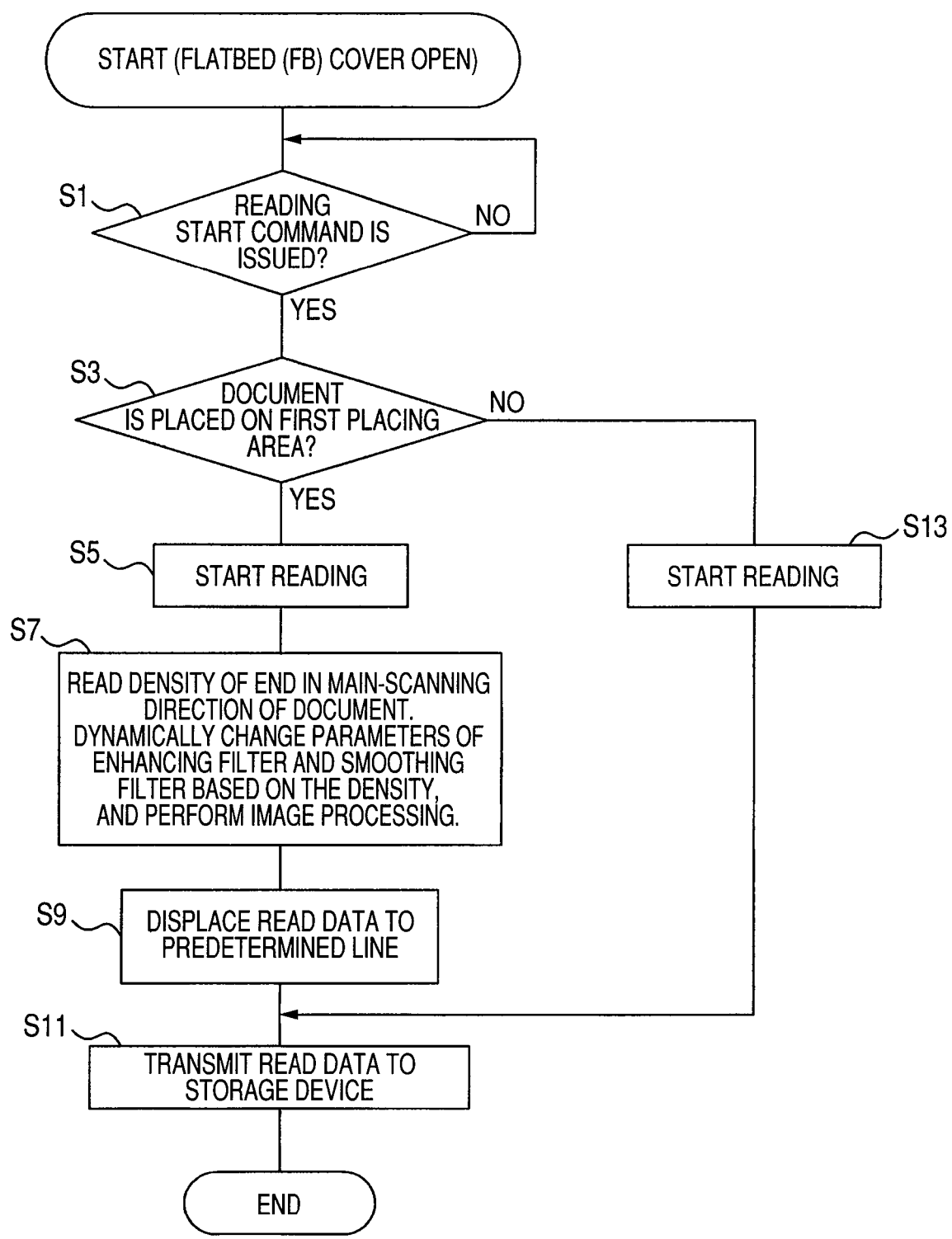
FIG. 5 is a flowchart showing control of the image reading device when reading a document on the stationary reading window (flatbed) according to the first exemplary embodiment of the present invention.

FIG. 5 is a flowchart showing control of the image reading device 1 when reading a document on the stationary reading window 7. This control flow starts when the open state of the document cover 3 is detected.

When the control flow shown in FIG. 5 starts, it is determined whether a reading start command is issued. The reading start command is issued (S1), for example, by pressing a reading start button. The reading start button is provided on an operation panel (not shown) of the image reading device 1 and is operable by a user.

If it is determined that the reading start command is issued (S1: YES), it is determined whether a document is placed on the first placing area 7A based on an output of the document placement sensor 13A (S3). Specifically, it is determined that the document is placed on the first placing area 7A if the document placement sensor 13A detects the document. On the other hand, it is determined that the document is placed on the second placing area 7B if the document placement sensor 13A does not detect the document.

If it is determined that a document is placed on the first placing area 7A (S3: YES), the image pickup device 13 is moved in the sub-scanning direction, and according to this movement, document reading starts (S5). If it is not determined that the reading start command is not issued (S1: NO), the device stands by.

Along with the movement in the sub-scanning direction, the image pickup device 13 measures a density (color density) at the end in the width direction (scanning direction) of the document, which is normally a margin in the sub-scanning direction. As a gap existing between the document and the stationary reading window 7 (first placing area 7A) becomes larger, the read image is more blurred. Therefore, it is advantageous that correction is made by changing parameters of an enhancing filter and a smoothing filter according to the size of the gap.

For example, in image data to be read, correction is made by changing parameters of the enhancing filter and the smoothing filter so that image blur is more reliably corrected at a portion with a larger gap between the document and the stationary reading window 7 (first placing area 7A).

It is considered that the density at the end in the width direction of the document measured by the image pickup device 13 and the size of the gap between the document and the stationary reading window 7 (first placing area 7A) almost correspond to each other, so that based on the measured density, the correction parameters (coefficients) of the enhancing filter and the smoothing filter are changed.

If the document reading starts, correction processing is applied to the image data by changing the correction parameters (coefficients) of the enhancing filter and the smoothing filter to be used for the correction processing according to the density of the document read at one end in the main-scanning direction (S7).

Next, the position displacement in the sub-scanning direction is corrected so that the reading start position when the document is placed on the first placing area 7A coincides with reading a start position when the document is placed on the second placing area 7B (S9).

Specifically, in this exemplary embodiment, the position of the first placing area 7A is displaced to the left side (automatic reading window 9 side) from the second placing area 7B as shown in FIG. 3. Therefore, in the case where the position read in actuality by the image pickup device 13 is defined as position coordinates of the image data, when the image data is printed or displayed, displacement occurs in the sub-scanning direction between the case where a document is placed on the first placing area 7A and read and the case where the same document is placed on the second placing area 7B and read.

Therefore, at S9, the position coordinates of the document data read on the first placing area 7A are shifted to the right side of the sheet surface to correct the position displacement in the sub-scanning direction. In this exemplary embodiment, the density correction (S7) and the position displacement correction (S9) are executed by the image processing circuit 34.

Then, when the density correction (S7) and the position displacement correction (S9) finish, the corrected image data is transmitted to and stored in the storage device 33 (S11).

On the other hand, at S3, if it is determined that no document is placed on the first placing area 7A, that is, a document is on the second placing area 7B (S3: NO), the image pickup device 13 is moved and starts reading the document (S13), and thereafter, the image data is stored in the storage device 33 without being subjected to the above-described two correction processings.

6. Features of Image Reading Device of this Exemplary Embodiment

In this exemplary embodiment, for example, the correction processing (S7) is executed only when a document is placed on the first area 7A by a user. That is, the correction processing (S7) is not executed when a document is placed on the second placing area by a user.

Therefore, unnecessary correction processing can be prevented according to a user's intention, so that the reading operation efficiency can be improved while preventing quality deterioration of read image data.

In this exemplary embodiment, the position displacement in the sub-scanning direction is corrected so that the reading start position when a document is placed on the first placing area 7A coincides with the reading start position when a document is placed on the second placing area 7B. Therefore, even if the first placing area 7A and the second placing area 7B are displaced from each other, the position of image data read when a document is placed on the first placing area 7A and the position of image data read when a document is placed on the second placing area 7B can be made to coincide with each other.

As described above, a document placed on the first placing area 7A is automatically subjected to the correction processing. Therefore, in the image reading device 1 according to this exemplary embodiment, when reading a document with a property for curvature, it is advantageous that the document is placed on the first placing area 7A and read, however, when the property for curvature is great, the document ends up curved before it is pressed by the document cover 3, so that it may be difficult to place the document on the first placing area 7A.

According to the configuration of this exemplary embodiment, a document end pressing member 7C is provided, so that when placing a document on the first placing area 7A, the end of the document can be pressed with the document end pressing member 7C.

Therefore, as shown in FIG. 3B, even in the case of a document with a property for curvature, a user can easily place the document on the first placing area 7A, so that the document with a property for curvature can be reliably subjected to the correcting processing when the document is read.

Regarding the image reading device according to this exemplary embodiment, it may be advantageous that a user is informed that, "to place a document with a property for curvature on the stationary reading window 7, it is preferable to press the document with the document end pressing member 7C" by mentioning this in a user's manual or the like. Thus, by informing a user of this, a user more reliably places a document with a property for curvature on the first placing area 7A, so that an image to be read from the document with a property for curvature is more reliably corrected.

The correction processing of S7 is generally executed by setting image data read at the scanning start position as a reference, so that it is advantageous that the document is in close contact with the document placing table 5 at least at the scanning start position.

In this exemplary embodiment, by providing the document end pressing member 7C at the scanning start position side of the end in the sub-scanning direction, at least at the scanning start position, the document is in close contact with the document placing table 5 (first placing area 7A), so that proper correction processing can be executed.

However, when a document has a property for curvature (curl), a gap easily appears between the document and the stationary reading window 7 (document placing table 5), and the larger the gap between the document and the stationary reading window 7 (first placing area 7A), the lower the quality of the image read, so that it is advantageous that the correction is performed by changing parameters of the enhancing filter and the smoothing filter according to the size of the gap.

In this exemplary embodiment, correction parameters (coefficients) of the enhancing filter and the smoothing filter to be used for the correction processing are changed based on the density of the document, so that proper correction processing can be executed and the quality of image data can be improved.

Additionally, when a gap is left between the document and the stationary reading window 7 (document placing table 5), this problem becomes conspicuous particularly when the CIS is used as the image pickup device 13, however, in this exemplary embodiment, as described above, image data is corrected as appropriate, so that the application to an image reading device using the CIS is effective.

Second Exemplary Embodiment

Figure 6:
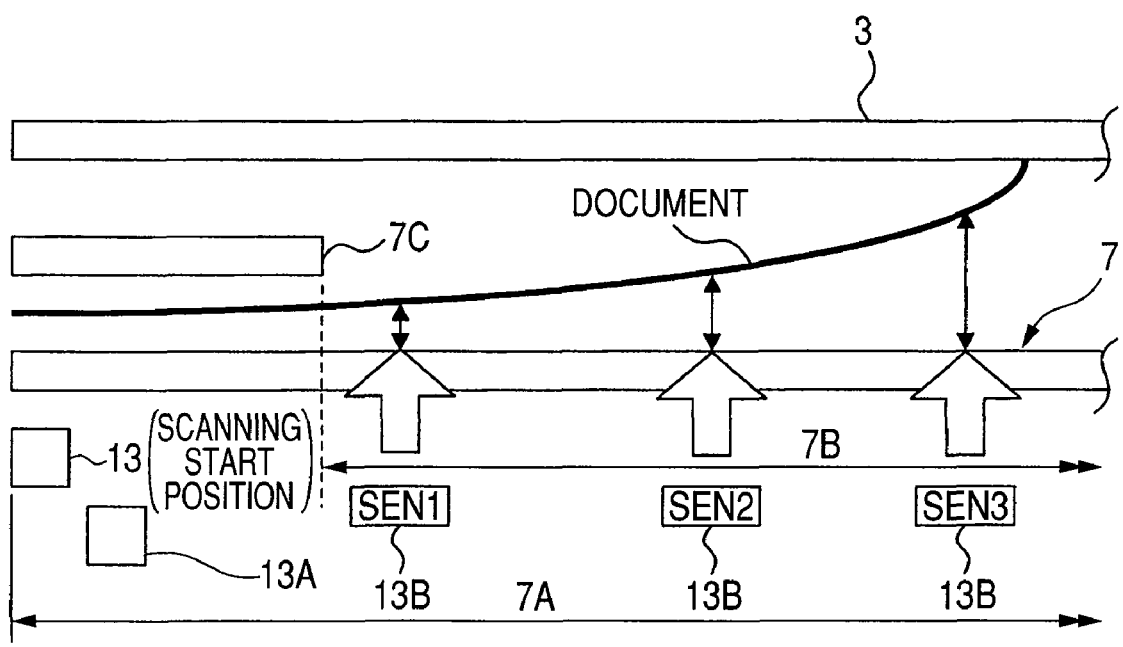
FIG. 6 is a view showing features of an image reading device according to a second exemplary embodiment of the present invention.

In the first exemplary embodiment described above, the density of a document, that is, a gap between the document and the stationary reading window 7 (document placing table 5) is detected based on read data of the image pickup device 13, and according to this detected density, correction parameters (coefficients) are changed. However, in the second exemplary embodiment, as shown in FIG. 6, a plurality of gap sensors 13B for detecting sizes of gaps are provided and arranged in the sub-scanning direction between the document and the stationary reading window 7 (document placing table 5). The correction parameters (coefficients) are changed based on detected values of these gap sensors 13B. FIG. 6 is a drawing showing features of this exemplary embodiment.

Accordingly, in the second exemplary embodiment, proper correction processing can also be executed, and the quality of image data can also be improved.

(Other Exemplary Embodiments)

In the above-described exemplary embodiments, an image reading device having an automatic document feeder is described. However, the present invention is not limited thereto. An image reading device may have only flatbed, or an image reading device may be integrated with an image forming device.

In the above-described exemplary embodiments, according to the gap between the document and the stationary reading window 7 (document placing table 5), the correction parameters (coefficients) are changed. However, the present invention is not limited thereto. For example, the correction parameters (coefficients) may be fixed.

In the above-described exemplary embodiments, image data read on the first placing area 7A is corrected so that the reading start position when the document is placed on the first placing area 7A coincides with the reading start position when the document is placed on the second placing area 7B. However, the present invention is not limited thereto. It may also be allowed that image data read on the second placing area 7B is corrected so that the position of both of the image data coincides with that of image data in the other case.

In the above-described exemplary embodiments, the document end pressing member 7C is disposed at the scanning start side end in the sub-scanning direction. However, the present invention is not limited thereto.

In the above-described exemplary embodiments, a CIS is used as the image pickup device 13. However, the present invention is not limited thereto. For example, a Charge-Coupled Device (CCD) may be used.

In the above-described exemplary embodiments, in the standby state, by making the image pickup device 13 stand by at a position displaced toward the scanning start position side from the document placement sensor 13A, the document placement sensor 13A is prevented from becoming incapable of detecting whether a document is placed. However, the present invention is not limited to this. For example, it may also be allowed that in the standby state, the image pickup device 13 is made to stand by at a position on the advancing side in the sub-scanning direction (right side of FIG. 2) with respect to the document placement sensor 13A. When reading a document, the image pickup device 13 is moved to the scanning start position side and then reading is started. The document placement sensor 13A may be disposed at a position displaced from the document end pressing member 7C and the optical axis direction of the document placement sensor 13A is tilted toward the sub-scanning direction. The document placement sensor 13A may be disposed on the document end pressing member 7C side in the direction orthogonal to the stationary reading window 7.

While the present invention has been shown and described with reference to certain exemplary embodiments thereof, it will be understood by those skilled in the art that various changes in form and details may be made therein without departing from the spirit and scope of the invention as defined by the appended claims.

What is claimed is:

1. An image reading device comprising:
   a document placing table including a first area and a second area;
   an image reading unit which reads an image on a document placed on the document placing table to obtain image data;
   a first detector configured to detect the document on the first area;
   a controller including:
      a determining unit which determines that the document is placed on the first area if the first detector detects the document and determines that the document is placed on the second area if the first detector does not detect the document, wherein a part of the first area and a part of the second area are overlapped with each other, and
      a first correction unit which corrects the image data obtained by the image reading unit based on a result of the determination by the determining unit; and
   a pressing member configured to press the document placed on the first area, the pressing member being provided at another part of the first area not overlapping the second area.

2. The image reading device according to claim 1, wherein the first correction unit corrects the image data obtained by the image reading unit if the determining unit determines that the document is placed on the first area and does not correct the image data obtained by the image reading unit if the determining unit determines that the document is placed on the second area.

3. The image reading device according to claim 1,
wherein the image reading unit moves in a first direction for reading the image on the document.

4. The image reading device according to claim 3,
wherein the first area is displaced from the second area in at least one of the first direction and a second direction orthogonal to the first direction.

5. The image reading device according to claim 4,
wherein the controller further includes a second correction unit which corrects the image data based on a displacement of the first area from the second area.

6. The image reading device according to claim 1,
wherein the first detector detects the document on the first area at a position corresponding to a position where the pressing member is provided.

7. The image reading device according to claim 1,
wherein the image reading unit moves from a reading start position for reading the image on the document,
wherein the first area is displaced from the second area in the first direction toward the reading start position, and
wherein the pressing member is provided above an end portion of the first area corresponding to the reading start position.

8. The image reading device according to claim 1, further comprising a second detector which detects a size of a gap existing between the document placing table and the document placed on the document placing table,
wherein the first correction unit corrects the image data according to the size of the gap detected by the second detector.

9. The image reading device according to claim 8,
wherein the image reading unit moves in a first direction for reading the image on the document, and
wherein the second detector is moved together with the image reading unit and detects the size of the gap existing between the document placing table and the document placed on the document placing table while moving with the image reading unit.

10. The image reading device according to claim 8,
wherein the image reading unit moves in a first direction for reading the image on the document, and
wherein the second detector includes a plurality of second detectors arranged in the first direction.

\* \* \* \* \*